Patented July 13, 1954

2,683,754

UNITED STATES PATENT OFFICE 2,683,754

METHOD OF CONDUCTING HYDROCARBON REACTIONS

Robert M. Kennedy, Newtown Square, and Abraham Schneider, Philadelphia, Pa., assignors to Sun Oil Company, Philadelphia, Pa., a corporation of New Jersey No Drawing. Application June 11, 1951,
Serial No. 231,055

16 Claims. (Cl. 260—666)

This invention relates to reactions involving olefins, naphthenes, alkyl fluorides and boron trifluoride, and is particularly directed to a method of reacting olefins with alkyl fluorides in the presence of alkyl substituted cyclopentanes and $BF_3$.

In an application for Letters Patent of the United States filed July 10, 1948 (Serial No. 38,167), now Patent No. 2,557,113, there is described and claimed reactions of isoparaffins and olefins catalyzed by the combination of $BF_3$ and an alkyl fluoride. In application Serial No. 86,526, filed April 9, 1949, now Patent No. 2,557,115, there is described and claimed the alkylation of isobutane with isobutylene catalyzed by $BF_3$ and an alkyl fluoride to form 2,2,4-trimethylpentane.

It has now been discovered that by bringing together an alkyl fluoride and $BF_3$ in the presence of a naphthene having a ring composed of 5 carbon atoms and at least 1 tertiary hydrogen atom and an olefin, a catalytic condition is established effective to cause alkylation of the olefin with the hydrocarbon portion of the alkyl fluoride and the simultaneous dimerization of the naphthene to form a polyalkyl substituted decalin. It is characteristic of the present process that a minor portion of the olefin is converted to the corresponding hydrocarbon, a portion of which may be isomerized to an isomer thereof.

To illustrate the process of the present invention, by contacting tertiary butyl fluoride and $BF_3$ in the presence of an admixture of methylcyclopentane and propene, the propene is alkylated by the fluoride to form branched chain isoparaffins consisting of a mixture of dimethylpentane isomers, and there is also formed a mixture of dimethyldecalins by the dimerization of the methylcyclopentane. There are also formed, in minor quantities, propane from the saturation of the propene and a higher boiling material, as hereinafter described.

In bringing together the alkyl fluoride and $BF_3$, the $BF_3$ can be introduced into an admixture of the naphthene and olefin to which the alkyl fluoride has already been added, or the alkyl fluoride and $BF_3$ can be introduced simultaneously but separately into the admixture. It is also permissible first to dissolve the alkyl fluoride and $BF_3$ in separate portions of the reactants, and then bring together the separate portions to effect reaction. However, operation should be such as to avoid contact between the $BF_3$ and olefin in the absence of the other components, since the olefin under such conditions will undergo polymerization. Also, it is not permissible to premix the alkyl fluoride and $BF_3$ and then add the mixture to an admixture of naphthene and olefin, for in such case the catalytic condition will be immediately spent when the alkyl fluoride and $BF_3$ are brought into contact with each other. The present reaction is not observed on the separate addition of the alkyl fluoride or $BF_3$ to the admixture of reactants or to either component thereof, but on contacting the olefin with $BF_3$ polymerization will be observed; it is only when the alkyl fluoride and $BF_3$ are brought together in the presence of both the naphthene and olefin, as above-described, that the present reaction occurs. It appears that the catalytic effect is produced by extraction of the fluorine atom from the alkyl fluoride by the $BF_3$, resulting in the formation of carbonium ions which initiate the reactions. The alkyl fluoride thus serves to catalyze the reaction and as a reactant therein. A small amount of the hydrocarbon corresponding to the fluoride appears in the product.

Cycloalkyl fluorides and $BF_3$ are both soluble in the components of the reaction mixture and form a homogeneous phase therewith irrespective of their mode of addition as above-described, so that the reaction does not depend upon contact of separate phases, and hence the mechanical agitation required to provide contact between separate phases is unnecessary. This is a significant advantage over processes involving contact between separate phases, such as hydrocarbon reactions catalyzed by Friedel-Crafts catalysts including for example, aluminum chloride or hydrogen fluoride. It is characteristic of the process of the present invention that the reaction occurs instantaneously, i. e. the reaction is complete as soon as the components are mixed. This also is a substantial advantage over processes requiring contact between separate phases in that the size of reactors, because of the rapid throughput which is limited only by practical considerations, is reduced to a minimum.

Upon completion of the reaction, the mixture becomes heterogeneous due to separation of a sludge from the hydrocarbon phase. This sludge may be conveniently separated by physical methods such as decanting or centrifuging. This material contains fluorine derived from the alkyl fluoride together with $BF_3$ in some sort of complex form. On heating the sludge, $BF_3$ and HF are evolved; the $BF_3$ may be recycled and the HF may be used to prepare additional alkyl fluoride for use in the reaction. The final residue may be discarded or used as a fuel.

The naphthenes which may be employed in the present process are the cyclopentanes, i. e., are the naphthenes which have a ring composed of 5 carbon atoms, and which have at least 1, but not more than 3, alkyl substituents attached to nuclear carbon atoms, and at least 1 tertiary hydrogen atom attached to a nuclear carbon atom. The total number of carbon atoms of the cyclopentane may vary from 6 to 30. Methylcyclopentane is a preferred naphthene to employ, as are ethylcyclopentane, propylcyclopentane, and isopropylcyclopentane, and good results are obtained with their homologues and isomers including, for example, the various dimethyl, diethyl, methylethyl, methylpropyl, and trimethyl cyclopentanes, and their higher homologues such as hexylcyclopentane, decylcyclopentane, and the like. Mixtures of naphthenes may also be employed such as those obtainable from petroleum, the $C_6$–$C_{10}$ fraction for example. Naphthenes having a ring composed of 6 carbon atoms do not undergo reaction in the present process.

By "tertiary hydrogen atom" is meant a hydrogen atom which is attached to a tertiary carbon atom, i. e. a hydrogen atom which is attached to a carbon atom which is also attached to three other carbon atoms.

The olefins which may be employed in the present process are preferably the non-cyclic mono-olefins, but cyclomono-olefins having a ring composed of 5 or 6 carbon atoms may be employed. As illustrative of the olefins which may be employed, ethylene, propene, butene-1, butene-2, isobutene, pentene-1, pentene-2, 2-methylhexene-3, the heptenes, octenes, and homologues and isomers thereof give good results. The cyclo-olefins which may be employed in the present process are the cyclic mono-olefins having a ring consisting of 5 or 6 carbon atoms with the olefinic linkage between nuclear carbon atoms. From 1 to 3 alkyl substituents may be attached to the ring. As illustrative of such cyclo-olefins, methylcyclopentene, ethylcyclopentene, n-propylcyclopentene, isopropylcyclopentene, the butylcyclopentenes, cyclohexene, methylcyclohexene, ethylcyclohexene, and the higher homologues and isomers thereof give good results. The total number of carbon atoms of the olefin or cyclo-olefin should not exceed 30 and preferably is not above 20. Preferred olefins and cyclo-olefins are ethylene, propene, butenes, pentenes, cyclopentene, methylcyclopentene, cyclohexene, and ethylcyclohexene.

The alkyl fluoride employed should have at least two carbon atoms per molecule. It may be a primary fluoride (i. e. one having the fluorine atom attached to a primary carbon atom), a secondary fluoride (i. e. where the fluorine atom is attached to a secondary carbon atom) or a tertiary fluoride (i. e. where the fluorine atom is attached to a tertiary carbon atom). Any primary, secondary or tertiary alkyl fluoride, other than methyl fluoride, is operative in combination with $BF_3$ to promote catalytic action and reaction in accordance with the invention. The temperature at which such catalytic action will be obtained varies, however, with the type of fluoride employed. The activity of the fluorides has been found to increase in the order of primary:secondary:tertiary. Thus, a higher temperature is necessary to obtain the desired catalytic effect with a secondary fluoride than with a tertiary fluoride; and a still higher temperature is required when a primary fluoride is employed. As a general rule the minimum temperatures at which the fluorides in combination with $BF_3$ will begin to exert substantial catalytic action are approximately as follows:

tertiary fluorides—minus 120° C.
secondary fluorides—minus 90° C.
primary fluorides—minus 10° C.

One exception is ethyl fluoride which has been found to be somewhat more inert than the alkyl fluorides having three or more carbon atoms per molecule and which requires a temperature of about +20° C. in order to give rise to substantial catalytic action. Methyl fluoride in combination with $BF_3$ does not give any substantial catalytic effect at least at temperatures below +150° C. and is not considered within the scope of the present invention.

As specific examples of primary fluorides which may be used in practicing the process, the following may be mentioned by way of illustration: ethyl fluoride; n-propyl fluoride; n-butyl fluoride; isobutyl fluoride; n-amyl fluoride; isoamyl fluoride; 1-fluoro-2-methyl butane; n-hexyl fluoride; and similar fluoride derivatives of hexanes, heptanes, octanes, or the like. As specific illustrations of secondary fluorides, the following may be mentioned: isopropyl fluoride; 2-fluoro butane; 2-fluoro-3-methyl butane; and 2-fluoro-3,3-dimethyl butane. A few specific examples of tertiary fluorides are: t-butyl fluoride; t-amyl fluoride; 2-fluoro-2,3-dimethyl butane, and other t-hexyl fluoride; t-heptyl fluorides; and 2-fluoro-2,4,4-trimethylpentane and other t-octyl fluorides. It will be understood that the specific compounds named above are given merely by way of illustration and that any alkyl fluoride (with the exception of methyl fluoride) will produce an operative catalytic combination with $BF_3$ provided the temperature is above the values as set forth above.

Although the mechanism of the present process is complicated the overall reaction may be demonstrated by the following equation which is presented to illustrate the process and the principal products obtained and which is not intended to show a carbon balance.

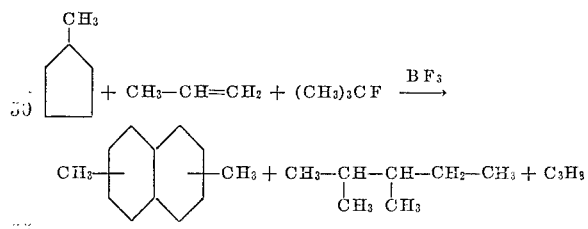

The dimethylpentane product is obtained by the alkylation of propene by the hydrocarbon portion of the alkyl fluoride, and in addition to the product shown isomers thereof are formed, principally 2,4-dimethylpentane. The 2,2,4-trimethylheptane illustrates a mixture of isomers thereof formed by the alkylation of the dimethylpentane product by the propene. The dimethyldecalin product is a dimer of methylcyclopentane and is a mixture of position and geometrical isomers. The propane formed is from the saturation of propene. In the absence of the methylcyclopentane the reaction between the olefin and alkyl fluoride does not occur as shown and instead a high molecular weight material having a wide boiling range is formed; and hence the presence of the naphthene is essential to the successful operation of the present process.

If a cyclo-olefin such as cyclopentene be substituted for the propene, such cyclo-olefin alkylates the alkyl fluoride to form a poly substituted cyclohexane. Hence, in the process illustrated by the equation, substituting cyclopentene for propene would yield a mixture of trimethylcyclohexane isomers instead of the dimethylpentane and trimethylheptane products as shown; dimethyldecalin would be observed as above.

The concentration of the reaction mixture components may be varied and good results obtained. The mole ratio of alkyl substituted cyclopentane to olefin should be from 2:1 to 20:1; the mole ratio of alkyl fluoride to olefin should be from 0.1:1 to 1:1; and the mole ratio of $BF_3$ to alkyl fluoride should be from 0.05:1 to 1:1, although larger quantities of $BF_3$ may be used if desired. The quantity of $BF_3$ to employ does not appear critical and only a small amount, a catalytic quantity, is sufficient to initiate the reaction which then proceeds to completion. It is preferred, however, to employ a somewhat larger quantity of $BF_3$ then is required to initiate the reaction, since the resulting reaction is then more sharply defined in the production of the desired products, i. e., the quantity of high boiling products is held to a minimum.

The present reaction is conducted in the liquid phase. The pressure to employ is advantageously that of $BF_3$ at the temperature of the reaction. Operating at a temperature within the preferred range with a concentration of $BF_3$ also within the preferred range, the pressure will be from about 100 to 200 p. s. i. g., but may vary from about 10 to 500 p. s. i. g.

The following examples are presented to illustrate specific embodiments of the present process, in which "parts" refers to parts by weight:

*Example 1*

A solution was prepared by dissolving 7.05 parts of $BF_3$ in 200 parts of methylcyclopentane. To this solution was added a solution consisting of 50.8 parts of propene, 94.6 parts of methylcyclopentane, and 45.2 parts of tertiary butyl fluoride. The mole ratio of methylcyclopentane to propene was 2.9; the mole ratio of the fluoride to propene was 0.49; and the mole ratio of $BF_3$ to the fluoride was 0.175. The temperature of reaction was 25° C. and the pressure about 100 p. s. i. g.

On mixing the two solutions the reaction occurred immediately, the pressure rapidly decreasing to about 10 p. s. i. g. A lower layer, consisting of 28.2 parts separated out and was separated by decanting. The organic layer was washed, dried, and distilled. There were recovered about 7.4 parts of propane, 218 parts of methylcyclopentane, 12.6 parts of dimethylpentanes consisting largely of 2,2-dimethylpentane and 2,4-dimethylpentane, 21.2 parts of trimethylheptanes consisting principally of 2,2,6-trimethylheptane, 4 parts of dimethyldecalin, and 25.9 parts of a higher boiling material.

*Example 2*

The procedure of Example 1 was substantially repeated using the same reactants except that cyclohexene was substituted for propene.

There were obtained substantial quantities of the alkylation product of cyclohexene and tertiary butyl fluoride, dimethyldecalins and cyclohexane.

The foregoing examples illustrate specific embodiments of the present process. When other reactants are substituted for those employed, corresponding products are obtained as hereinbefore described.

The branched chain paraffins prepared in the present process are useful as components for high octane fuels. The alkylated naphthenes, including the alkyl substituted cyclohexanes and decalins prepared in the present process are useful for the preparation of relatively pure aromatics by dehydrogenation, and for the preparation of other chemical compounds.

In patent application Serial No. 231,052, filed June 11, 1951, there is described and claimed the reaction of isoparaffins having at least 1 tertiary hydrogen atom per molecule to form alkyl substituted naphthenes by bringing together a cycloalkyl fluoride and $BF_3$ in the presence of the naphthene.

In patent application Serial No. 231,054, filed June 11, 1951, there is described and claimed the reactions of cyclopentanes having at least 1 tertiary hydrogen atom attached to a nuclear carbon atom by bringing together $BF_3$ and an alkyl fluoride in the presence of the naphthene to form polyalkyl naphthenes.

In patent application Serial No. 231,056, filed June 11, 1951, there is described and claimed the reactions of cyclopentanes having at least 1 tertiary hydrogen atom attached to a nuclear carbon atom or isoparaffins having at least 1 tertiary hydrogen atom with olefins by bringing together $BF_3$ and a cycloalkyl fluoride in the presence of a mixture thereof to form alkylated and polyalkylated naphthenes.

In patent application Serial No. 231,053, filed June 11, 1951, there is described and claimed the dimerization of cyclopentanes having at least 1 tertiary hydrogen atom attached to a nuclear carbon atom by bringing together $BF_3$ and cycloalkyl fluoride in the presence of the naphthene.

In patent application Serial No. 231,057, filed June 11, 1951, there is described and claimed the reactions between cyclopentanes having at least 1 tertiary hydrogen atom attached to a nuclear carbon atom and a cyclo-olefin by bringing together $BF_3$ and a cycloalkyl fluoride in the presence of a mixture thereof to form the alkylation product of the naphthene and cyclo-olefin and other hydrocarbons.

In patent application Serial No. 231,058, filed June 11, 1951, there is described and claimed the separation of naphthenes having a ring composed of 5 carbon atoms and at least 1 tertiary hydrogen atom attached to a nuclear carbon atom from naphthenes having a ring composed of 6 carbon atoms by bringing together, in the presence of a mixture thereof, $BF_3$ and an alkyl fluoride or a cycloalkyl fluoride.

The invention claimed is:

1. Method of alkylating an olefin with an alkyl fluoride which comprises bringing together, in liquid homogeneous phase, $BF_3$ and an alkyl fluoride having at least 2 carbon atoms per molecule in the presence of a cyclopentane having at least 1 alkyl substituent and at least 1 tertiary hydrogen atom attached to a nuclear carbon atom and a hydrocarbon having 1 olefinic bond to effect instantaneous alkylation of the olefinic hydrocarbon with said alkyl fluoride.

2. Method of alkylating an olefin with an alkyl fluoride which comprises bringing together, in liquid homogeneous phase, $BF_3$ and an alkyl fluoride having at least 2 carbon atoms per molecule in the presence of a cyclopentane having at least 1 alkyl substituent and at least 1 tertiary hydrogen atom attached to a nuclear carbon atom and a hydrocarbon having 1 olefinic bond at a temperature sufficient to effect said alkylation by instantaneous reaction, said temperature being in the range of from −120° C. to 150° C.

3. Method of alkylating a cyclomono-olefin with an alkyl fluoride which comprises bringing together, in liquid homogeneous phase, BF₃ and an alkyl fluoride having at least 2 carbon atoms per molecule in the presence of a cyclopentane having at least 1 alkyl substituent and at least 1 tertiary hydrogen atom attached to a nuclear carbon atom and a cyclomono-olefin at a temperature sufficient to effect said alkylation by instantaneous reaction, said temperature being in the range of from −120° C. to 150° C.

4. Method according to claim 3 wherein the cyclomono-olefin is cyclohexene.

5. Method according to claim 4 wherein the alkyl fluoride is tertiary butyl fluoride.

6. Method of alkylating a mono-olefin with an alkyl fluoride which comprises bringing together, in liquid homogeneous phase, BF₃ and an alkyl fluoride having at least 2 carbon atoms per molecule in the presence of a cyclopentane having at least 1 alkyl substituent and at least 1 tertiary hydrogen atom attached to a nuclear carbon atom and a mono-olefin at a temperature sufficient to effect said alkylation by instantaneous reaction, said temperature being in the range of from −120° C. to 150° C.

7. Method according to claim 6 wherein the olefin is ethylene.

8. Method according to claim 6 wherein the olefin is propene.

9. Method according to claim 6 wherein the olefin is butene-1.

10. Method according to claim 6 wherein the olefin is isobutene.

11. Method according to claim 6 wherein the alkyl fluoride is a primary alkyl fluoride.

12. Method according to claim 6 wherein the alkyl fluoride is a secondary alkyl fluoride.

13. Method according to claim 6 wherein the alkyl fluoride is isopropyl fluoride.

14. Method according to claim 6 wherein the alkyl fluoride is a tertiary alkyl fluoride.

15. Method according to claim 6 wherein the alkyl fluoride is tertiary butyl fluoride.

16. Method according to claim 6 wherein dimethyldecalins are separated from the reaction mixture.

References Cited in the file of this patent

UNITED STATES PATENTS

| Number | Name | Date |
|---|---|---|
| 2,413,384 | Schmerling | Dec. 31, 1946 |